United States Patent
Zang et al.

(10) Patent No.: US 12,295,082 B2
(45) Date of Patent: May 6, 2025

(54) SYSTEM AND METHODS TO PROVIDE IMMERSIVE LIGHTING INTERACTION

(71) Applicant: SIGNIFY HOLDING B.V., Eindhoven (NL)

(72) Inventors: Yizhou Zang, Cambridge, MA (US); Rohit Kumar, Hackensack, NJ (US); Ruohua Yin, Cambridge, MA (US); Alexandru Darie, Lincoln, MA (US); Andrew Mahoney, Burlington, MA (US); Yuming Huang, Cambridge, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 463 days.

(21) Appl. No.: 17/633,489

(22) PCT Filed: Aug. 4, 2020

(86) PCT No.: PCT/EP2020/071894
§ 371 (c)(1),
(2) Date: Feb. 7, 2022

(87) PCT Pub. No.: WO2021/028265
PCT Pub. Date: Feb. 18, 2021

(65) Prior Publication Data
US 2022/0287166 A1 Sep. 8, 2022

(30) Foreign Application Priority Data
Oct. 7, 2019 (EP) .................... 19201682

(51) Int. Cl.
*H05B 47/115* (2020.01)
*H05B 47/105* (2020.01)
*H05B 47/19* (2020.01)

(52) U.S. Cl.
CPC ........ *H05B 47/115* (2020.01); *H05B 47/105* (2020.01); *H05B 47/19* (2020.01)

(58) Field of Classification Search
CPC .... H05B 47/115; H05B 47/105; H05B 47/19; H05B 45/20; G06F 3/0346; G06F 3/017
See application file for complete search history.

(56) References Cited

U.S. PATENT DOCUMENTS 8,786,198 B2   7/2014  De Groot
10,108,903 B1  10/2018 Piao et al.
(Continued)

FOREIGN PATENT DOCUMENTS

CA   2777482 A1    11/2013
CN   104244044 A   12/2014
(Continued)

*Primary Examiner* — Donald L Raleigh (57) ABSTRACT

A system and methods are provided for an immersive group lighting interaction. A lighting infrastructure includes a plurality of independently controllable lighting devices. According to an embodiment, users may be granted access to control at least a portion of the lighting infrastructure. Rather than requiring the user to manually control the lighting infrastructure using, for example, the touch screen, a sensor associated with the user's mobile device may track the user. The sensor data may be classified and then mapped to a corresponding control instruction to control the lighting infrastructure. In another embodiment, a computing system receives sensor classifications from multiple users. If a threshold amount of a type of classification is received, the computing system controls a lighting infrastructure according to that type of classification.

15 Claims, 9 Drawing Sheets

(56) References Cited

U.S. PATENT DOCUMENTS

| | | |
|---|---|---|
| 10,856,387 B2 | 12/2020 | Den Hartog et al. |
| 2014/0247132 A1 | 9/2014 | Fukuma et al. |
| 2015/0254570 A1* | 9/2015 | Florence .............. H05B 47/115 706/52 |
| 2016/0286625 A1 | 9/2016 | Olsen et al. |
| 2017/0135177 A1 | 5/2017 | Wang et al. |
| 2018/0089586 A1 | 3/2018 | Pau et al. |

FOREIGN PATENT DOCUMENTS

| | | |
|---|---|---|
| EP | 3517839 A1 | 7/2019 |
| WO | 2015051046 A1 | 4/2015 |
| WO | 2019016764 A1 | 1/2019 |

\* cited by examiner

SYSTEM AND METHODS TO PROVIDE IMMERSIVE LIGHTING INTERACTION

CROSS-REFERENCE TO PRIOR APPLICATIONS

This application is the U.S. National Phase application under 35 U.S.C. § 371 of International Application No. PCT/EP2020/071894, filed on Aug. 4, 2020, which claims the benefit of European Patent Application No. 19201682.2, filed on Oct. 7, 2019, which claims the benefit of U.S. Provisional Patent Application Ser. No. 62/885,625, filed on Aug. 12, 2019. These applications are hereby incorporated by reference herein.

FIELD OF THE INVENTION

The invention relates to systems and methods for controlling a lighting infrastructure by one or more users based on sensor data received by a user's mobile device.

BACKGROUND

Lighting infrastructures such as bridges, buildings, monuments, or other large-scale structures, are made up of multiple lighting devices. A lighting controller communicates with the lighting infrastructure to control each lighting device. To control a lighting infrastructure, a user manipulates controls using a traditional input mechanism such as a touch screen or other curser of a client device. This requires a user to view a user interface and manipulate one or more user interface controls. This may involve a graphic user interface (GUI) that includes buttons, sliders, switches, checkboxes, menus, or text fields that allow a user to input his or her input control. The drawback to this approach is it requires the user to draw attention away from other activities and focus on the GUI. When a user is focused on viewing the user interface of the client device, the user cannot enjoy his or her environment. There exist systems that address the situation for controlling a lighting infrastructure that does not require the user to view a GUI.

The prior art lacks the ability to allow a user to control a lighting infrastructure without the use of a GUI. For example, prior art systems allow a user to reserve a timeslot to manipulate a lighting infrastructure. Once a reservation is made, the user, using a mobile application installed on a client device, can manipulate a touch screen to change the lighting controls of a lighting infrastructure such as, for example, the color or intensity of lights. Specifically, the user may touch, and thereby select, a particular color displayed on a GUI generated by the mobile application to control the lighting infrastructure to display the selected color. Such solutions require the user to manipulate a GUI to control the lighting infrastructure.

Other prior art systems include a lighting infrastructure that is controlled by pre-programmed animation sequences. Here, no user input is required. Rather, a particular sequence that is stored in computer memory is read and converted into a lighting signal to control the lighting infrastructure. In other prior art, more sophisticated lighting controls are based on real-time data, including, for example, weather data. Weather data obtained over a network is converted into a corresponding lighting control. Such solutions, however, permit no user interaction.

The present disclosure overcomes the problems in the prior art by providing an immersive lighting experience where a GUI is not used to control a lighting infrastructure. The present disclosure also includes embodiments allowing group behavior to control a lighting infrastructure.

SUMMARY OF THE INVENTION

One aspect of the present invention is related to a client device that is configured to communicate with a lighting controller that controls the lighting infrastructure. The client device controls the lighting infrastructure via a computing system such as, for example, a server. The client device includes a processor, a sensor, and a communication interface that is configured to communicate with a computing system. The client device also includes a memory that stores computer instructions, which are executable by the processor. The client device uses these instructions to receive sensor samples from the sensor. The client device then classifies a subset of the sensor samples to generate a classification of the sensor samples. The client device maps the classification to a corresponding control instruction and transmits the control instruction to the computing system. The computing system is configured to send a control signal to the lighting controller to control the lighting infrastructure according to the control instruction.

According to one embodiment the sensor comprises a motion sensor that generates sensor samples. Sensor samples may be acceleration samples or gyroscope samples. In addition, the classification involves a motion classification specifying a type of motion.

According to another embodiment the sensor is a wireless accessory of the client device. In another embodiment, the client device comprises a wristwatch, a smartphone, or a wearable device.

According to another embodiment, the client device comprises a long short term memory (LSTM) classifier comprising a plurality of cells, each cell configured to receive a corresponding sensor sample from the subset of sensor samples.

Another aspect of the present invention is directed to an immersive group lighting experience where group behavior is translated into a control signal to control a lighting infrastructure. According to an embodiment, a computing system is configured to receive a plurality of classifications from a plurality of client devices, determine whether a type of the received classification exceeds a threshold amount, and send a control signal to the lighting controller to control the lighting infrastructure according to the control signal that corresponds to the type of received classification.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 schematically shows an example of an embodiment of an immersive lighting system, FIG. 2 schematically shows an example of communication between a client device and a computing system in an embodiment of the immersive lighting system of FIG. 1.

DETAILED DESCRIPTION OF PREFERRED EMBODIMENTS

The embodiments shown in the drawings and described in detail herein should be considered exemplary of the principles of the invention and not intended to limit the invention to the specific embodiments shown and described herein.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1:
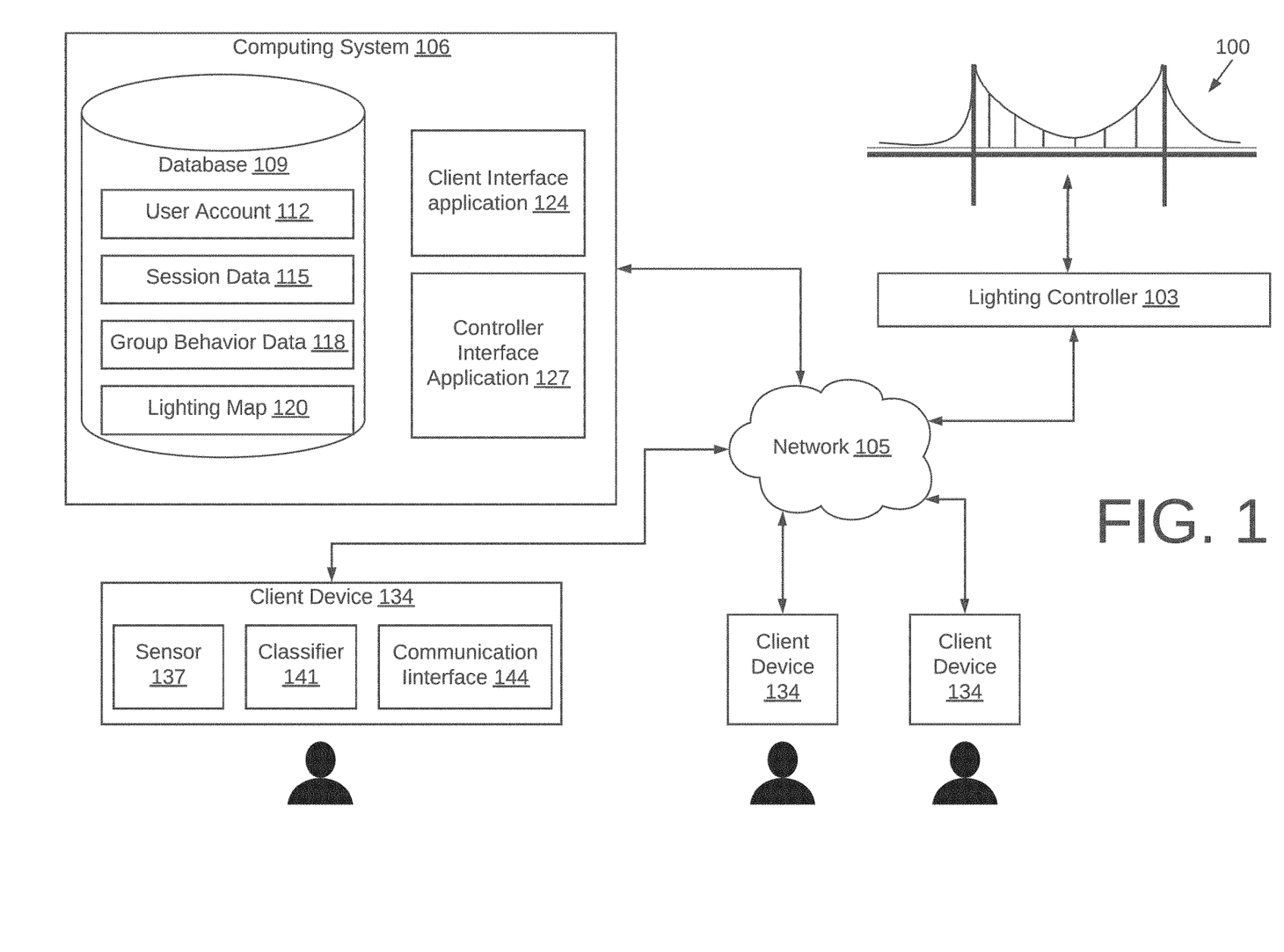

FIG. 1 schematically shows an example of an embodiment of an immersive lighting system. FIG. 1 depicts a networked environment that includes a lighting infrastructure 100 that is controlled by a lighting controller 103. The lighting infrastructure 100 may be a bridge, building, monument, stadium, arena, or other large scale structure. The lighting infrastructure 100 is made up of multiple lighting devices. A lighting device includes one or more light sources such as, for example, a light emitting devices (LED). Each lighting device can be grouped together and controlled as a group. Each lighting device is installed within the lighting infrastructure 100 to provide lighting at a large scale. The lighting controller 103 may be a device that controls each lighting device installed in the lighting infrastructure. In this respect, the lighting controller 103 communicates with the lighting devices of the lighting infrastructure using any communication protocol.

The lighting controller 103 communicates with other system components over a network 105. The network 105 includes the Internet, intranets, extranets, wide area networks (WANs), local area networks (LANs), wired networks, wireless networks, or other suitable networks, etc., or any combination of two or more such networks.

The immersive lighting system of FIG. 1 further includes a computing system 106 connected to the network 105. The computing system 106 may comprise, for example, a server computer or any other system providing computing capability. Alternatively, the computing system 106 may employ a plurality of computing devices that may be arranged, for example, in one or more server banks or computer banks or other arrangements. Such computing devices may be located in a single installation or may be distributed among many different geographical locations. For example, the computing system may include a plurality of computing devices that together may comprise a hosted computing resource, a grid computing resource and/or any other distributed computing arrangement. In some cases, the computing system 106 may correspond to an elastic computing resource where the allotted capacity of processing, network, storage, or other computing-related resources may vary over time. The computing system 106 may implement one or more virtual machines that use the resources of the computing system 106.

The computing system 106 includes a database 109. Various data is stored in the database 109 or other memory that is accessible to the computing system 106. The database 109 may represent one or more databases 109. The data stored in the database 109 includes user accounts 112, session data 115, group behavior data 118, and a lighting map 120. A user account 112 includes information about a user including a user name, password, authentication information, and/or login credentials. The purpose of the user account 112 is to register users who intend to access the immersive lighting system for controlling the lighting infrastructure 100. In this respect, the user account 112, provides information to authenticate and authorize users who wish to access the system. Session data 115 includes information about active sessions established with the immersive lighting system. Group behavior data 118 includes real-time information about a plurality of users to make determinations relating to how to control the lighting infrastructure 100. The lighting map 120 includes information that clusters together one or more LEDs of the lighting infrastructure 100 to a corresponding cluster identifier so that each LED can be independently controlled. For example, a control signal to control the lighting infrastructure 100 such that it is applied only to a cluster identifier, thereby controlling one or more LEDs independently.

Various applications and/or other functionality may be executed in the computing system 106. This includes, for example, a client interface application 124 and a controller interface application 127. The client interface application 124 provides an interface to client devices, as described below. The controller interface application 127 provides an interface to the lighting controller 103.

As mentioned above, also connected to the network 105 are a plurality of client devices 134 operated by different users. The client device 134 is portable so that it can be carried by a user and easily transported to a lighting infrastructure 100. A client device may be, for example, a mobile phone, tablet, a wearable device (e.g., a wristwatch), or any other portable, mobile device that serves as a client. The client device 134 includes a sensor 137, a classifier 141, and a communication interface 144. The sensor may be a wireless accessory to the client device 134 or it may be integrated into the housing of the client device 134. The sensor may be a motion sensor, heat sensor, microphone, light sensor, camera, or biometric sensor. The classifier 141 may include a software component that analyzes sensor data and classifies it based on detecting patterns. The communication interface 144 allows the client device 134 to communicate with the computing system 106 over the network 105. The client device 134 is configured to control the lighting infrastructure 100 by way of communicating with the computing system, which communicates with the lighting controller 103.

Next is a description of how the various components of FIG. 1 are configured to implement a group lighting system. A user using a client device 134 wishes to interact with the lighting infrastructure 100. For example, if the lighting infrastructure is installed in a stadium that hosts a sporting event, the user may desire to control the stadium lighting to reflect the user's mood. Depending on how the user moves the client device, the lighting infrastructure 100 changes the lighting recipe. Different motions correspond to different lighting animations or different lighting control instructions such as, for example, altering color, hue, intensity, brightness, etc. Allowing a user to control a lighting infrastructure 100 without using traditional inputs, such as a touch screen control, achieves an immersive experience.

A session between the computing system 106 and the user is established and the occurrence of that session is stored as session data 115. A session may be established by the client device 134 requesting permission. The computing system 106 may invite the client device 134 submit a request.

According to one embodiment of the present invention, once a session is established, the client device 134 is configured to send a control instruction to control the lighting infrastructure 100, where the control instruction is derived from sensor data. In this case, the sensor 137 of the client device 134 generates sensor samples. These sensor samples are analyzed by a classifier 141 to generate a classification. The type of classification is mapped to a corresponding control instruction. The communication interface 144 of client device 134 sends the control instruction to the client interface application 124 of the computing system 106. The computing system 106 interprets the control instruction and generates a corresponding control signal. The controller interface application 127 of the computing system 106 transmits the control signal the lighting controller 103 so that one or more LEDs of the lighting infrastructure 100 are controlled according to the control instruction originating from the client device 134.

According to another embodiment, the immersive experience may be an immersive group experience where group behavior dictates how the lighting infrastructure 100 is controlled. Synchronous group behavior may trigger lighting changes in the way the lighting infrastructure 100 displays light.

In this embodiment, the computing system 106 communicates with a plurality of client devices 134. Each client device 134 includes a sensor that generates sensor data. The sensor data from each client device 134 is classified using the respective classifiers 141. The classifications resulting from the classifiers 141 are transmitted to the client interface application 124. These classifications are stored as group behavior data 118. The computing system 106 analyzes the group behavior data to determine if a threshold amount of classifications of sensor data from a plurality of client devices is met. For example, a classifier 141 may be configured to classify motion sensor data into several classifications, one of which includes the motion of standing up. If a quantification of the type of classifications for a "standing up" motion received by the computing system 106 exceeds a threshold amount, then the computing system may send a corresponding control signal to the lighting controller so that the lights of the lighting infrastructure 100 are controlled in a corresponding manner. In this respect, the classifications may be quantified by the number of a particular type of classification received for a duration of time, a percentage of a particular type of classification based on all classifications received, or the frequency, periodicity, or rate that a particular type of classification is received for a duration of time.

Functionality described as being performed locally (e.g., in a client device 134) may be distributed to being performed remotely (e.g., by the computing system 106). For example, the classifier 141 may be implemented in the computing system 106 instead of the client device 134. In this case, the client device 134 transmits sensor data to the computing system 106 for subsequent classification. Alternatively, the classification of sensor data may be initially performed by a client-side classifier 141 and then completed by a classifier residing in the computing system 106.

Figure 2:
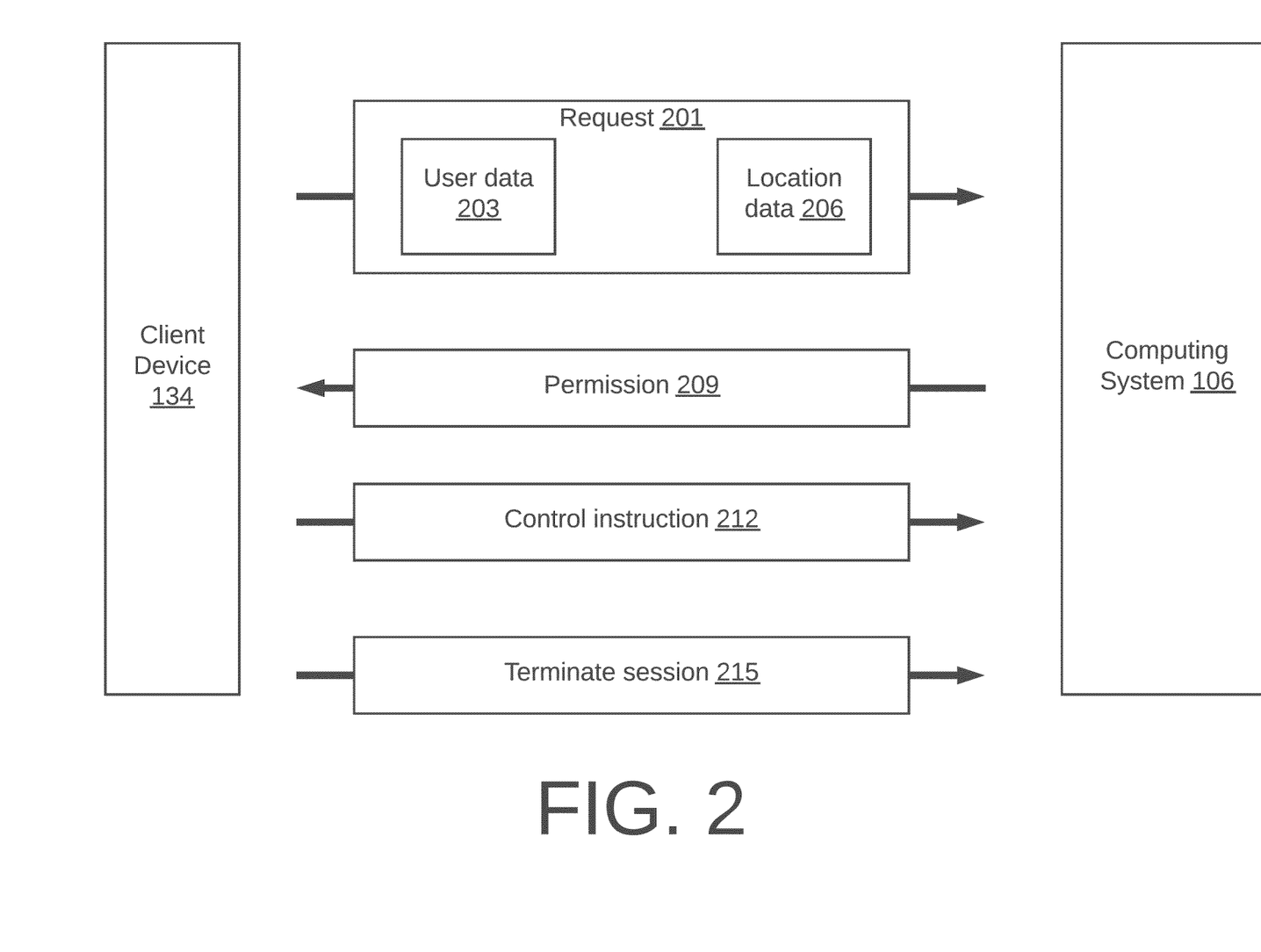

FIG. 2 schematically shows an example of communication between a client device 134 and a computing system 106 in the immersive lighting system of FIG. 1. A client device 134 sends a control request 201 to computing system 106. According to an embodiment, the control request 201 includes user data 203 and location data 206. The user data 203 may include information identifying the user of the client device 134, such as, for example, a user identifier. Location data 206 may include location coordinates of the client device 134 that submitted the control request 201. For example, the client device 134 may include a location module that obtains location coordinates or a relative location of the client device 134. The location module may be a Global Navigation Satellite System (GNSS) module to obtain geographic coordinates. The location module may be configured to detect the distance or relative location with respect to the lighting infrastructure 100. When submitting the control request 201, the client device 134 accesses the location module to embed the location coordinates or location data into the control request 201. Although FIG. 2 shows the client device 134 sending the request 201, the control request 201 may be solicited by the computing system 106.

When the computing system 106 receives the control request 201, the computing system 106 may authenticate the request. For example, the computing system 106 cross references user accounts 112 with the user data 203 to determine whether the client device 134 that submitted the control request 201 is associated with an authorized user. Thus, the computing system 106 obtains information about the user who submitted the control request 201.

Upon authenticating the user, the computing system 106 transmits a permission 209 to the client device 134. The permission 209 authorizes the client device 134 to submit subsequent control instructions 212 to the computing system 106. By granting a client device permission 209, a session is established and session data 115 is updated accordingly. During the session, one or more control instructions 212 are submitted by the client device 134. Alternatively, when controlling the lighting infrastructure 100 using group behavior, the computing system 106 may derive one or more control instructions 212 based on classifications of sensor data received from a plurality of client devices 134. As described in more detail below, the control instructions 212 are derived from sensor data as opposed to a user manipulating a GUI.

For example, depending on how the sensor 137 senses the way the user moves the client device 134, a corresponding control instruction 212 is generated. For example, moving the sensor 137 upwards increases the intensity while moving it downwards reduces the intensity. The sensor 137 may generate a motion sensor output that is classified by a classifier 141 to generate a corresponding control instruction 212.

In another embodiment, the sensor is a camera and the control instruction 212 is derived from an output of the camera. For example, a facial recognition or pattern recognition program may be applied to a digital image obtained from the camera to generate a corresponding control instruction 212. For example, smiling may correspond to a turn-on-light control instruction while frowning may correspond to a turn-off-light control instruction.

The client device 134 may submit one or more control instructions 212 as long as a session persists. In one embodiment, the user may end the session and transmit a terminate session message 215 to the computing device. After a session is terminated, the computing system 106 does not process any subsequent control instructions 212 from the client device 134 unless a new session is established.

Figure 3:
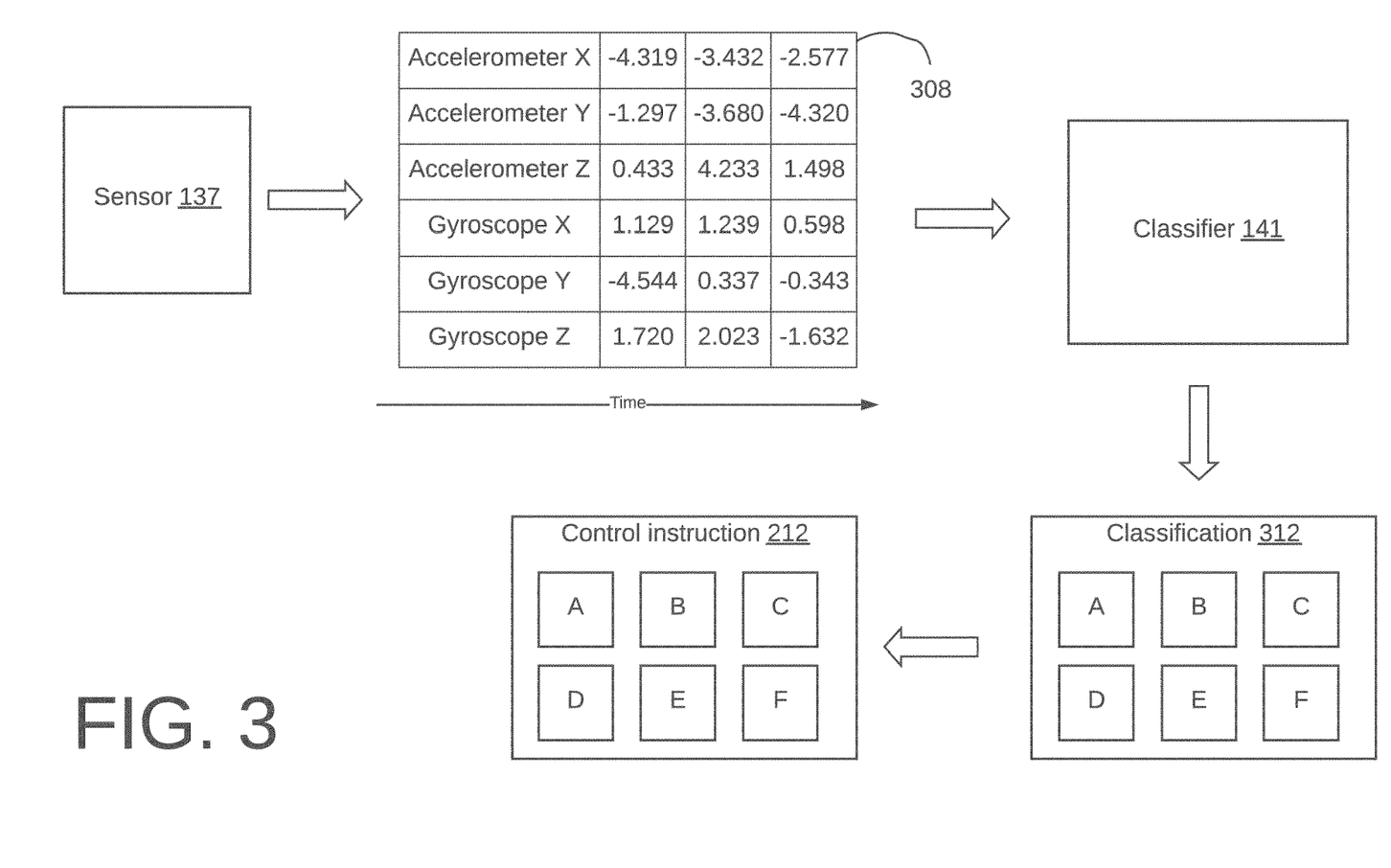
FIG. 3 depicts various data that is transmitted and calculated in an embodiment of the immersive lighting system of FIG. 1, FIG. 4 depict an example of a classifier in an embodiment of the immersive lighting system of FIG. 1.

FIG. 3 depicts various data that is transmitted and calculated in an embodiment of the immersive lighting system of FIG. 1. FIG. 3 shows an embodiment of a client device 134 that receives sensor data from a sensor 137 to generate a classification 312 and corresponding control instruction 212.

A sensor 137 converts physical inputs such as, for example, light, movement, heat, or electricity, into computer readable sensor data. The sensor data may be formatted as a series of sensor samples 308 where each sample time includes one or more sensor readings. The embodiment of FIG. 3 shows a motion sensor 137 that generates motion sensor samples 308 on a periodic basis. A motion sensor sample 308 may include an accelerometer reading along a particular axis (e.g., x-axis, y-axis, z-axis) and/or a gyroscope reading along a particular axis (e.g., x-axis, y-axis, z-axis).

The client device 134 includes a classifier 141 that receives sensor data such as a stream of sensor samples 308. The classifier 141 is configured to analyze the sensor samples 308 and generate a classification 312. In this respect, the classifier 141 determines whether the sample data matches one among a finite set of classifications. In the case of a motion sensor 137, the classifier 141 may be may be configured to determine if the sensor samples 308 correspond to a motion classification 312 such as an upward motion, a downward motion, a shaking motion, a clockwise rotation, a counter clockwise rotation, a side-to-side motion, etc. The example of FIG. 3 shows six different classifications of the sample data, A through F. In the event that the sample data does not match a predefined classification 312, then the classifier 141 determines that no classification exists for the analyzed sample data.

Next, the client device 134 maps a determined classification 312 to a corresponding control instruction 212. According to an embodiment, the client device 134 stores a map that translates the classification 312 to a control instruction 212. In this respect, Classification A maps to Control Instruction A, Classification B maps to Control Instruction B, etc. To illustrate, Classification A may be an upward motion and Classification B may be a downward motion. Control Instruction A may be an instruction to increase light intensity and Control Instruction B may be an instruction to decrease light intensity. When the sensor moves upwards, an instruction to increase light intensity is generated and when the sensor moves downwards, an instruction to decrease light intensity is generated. A user may manipulate the client device 134 to generate control instructions that correlate with movement.

Figure 4:
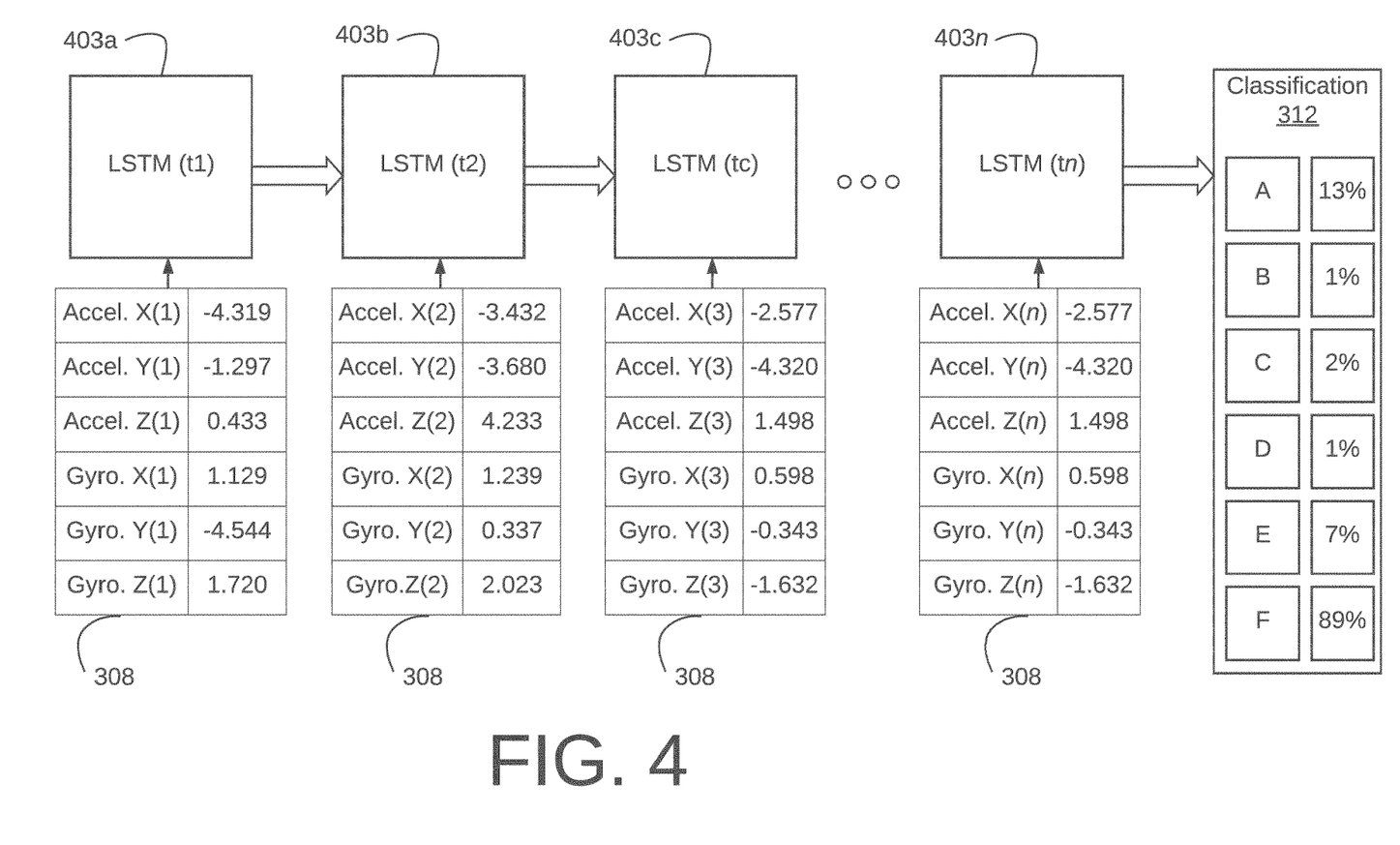

FIG. 4 depict an examples of a classifier 141 in an embodiment of the immersive lighting system of FIG. 1. FIG. 4 shows an embodiment of implementing the classifier 141 as a Long Short-Term Memory (LSTM) classifier 141. The LSTM classifier 141 is trained with training data made up of sets of training samples.

The LSTM classifier 141 is made up of a plurality of LSTM cells 403*a-n*. The first LSTM cell feeds its output to the next LSTM cell in the series. Each LSTM cell 403 receives a corresponding sensor 308 sample from a series of sensor samples 308 as a raw input. If the LSTM classifier 141 is configured to analyze ten samples (e.g., n=10), to make a classification determination, then ten LSTM cells 403 are used, each LSTM cell receives a corresponding sensor sample 308. The number of LSTM cells (n) may be selected based on the longest time series in the training data.

The output of the LSTM classifier 141 is analyzed to generate the probabilities that the inputted sensor samples falls within each of the classifications. As shown in FIG. 4, each classification 312, labeled A-F has a corresponding probability score. The probability score indicates how likely the sensor samples 308 inputted into the classifier 141 fall within a classification 312. FIG. 4 shows an example where Classification F has the highest probability score of 89% while the other classifications 312 have significantly smaller scores. When the probability score exceeds a threshold score, the corresponding classification 312 is applied to the inputted sensor samples 308.

Figure 5:
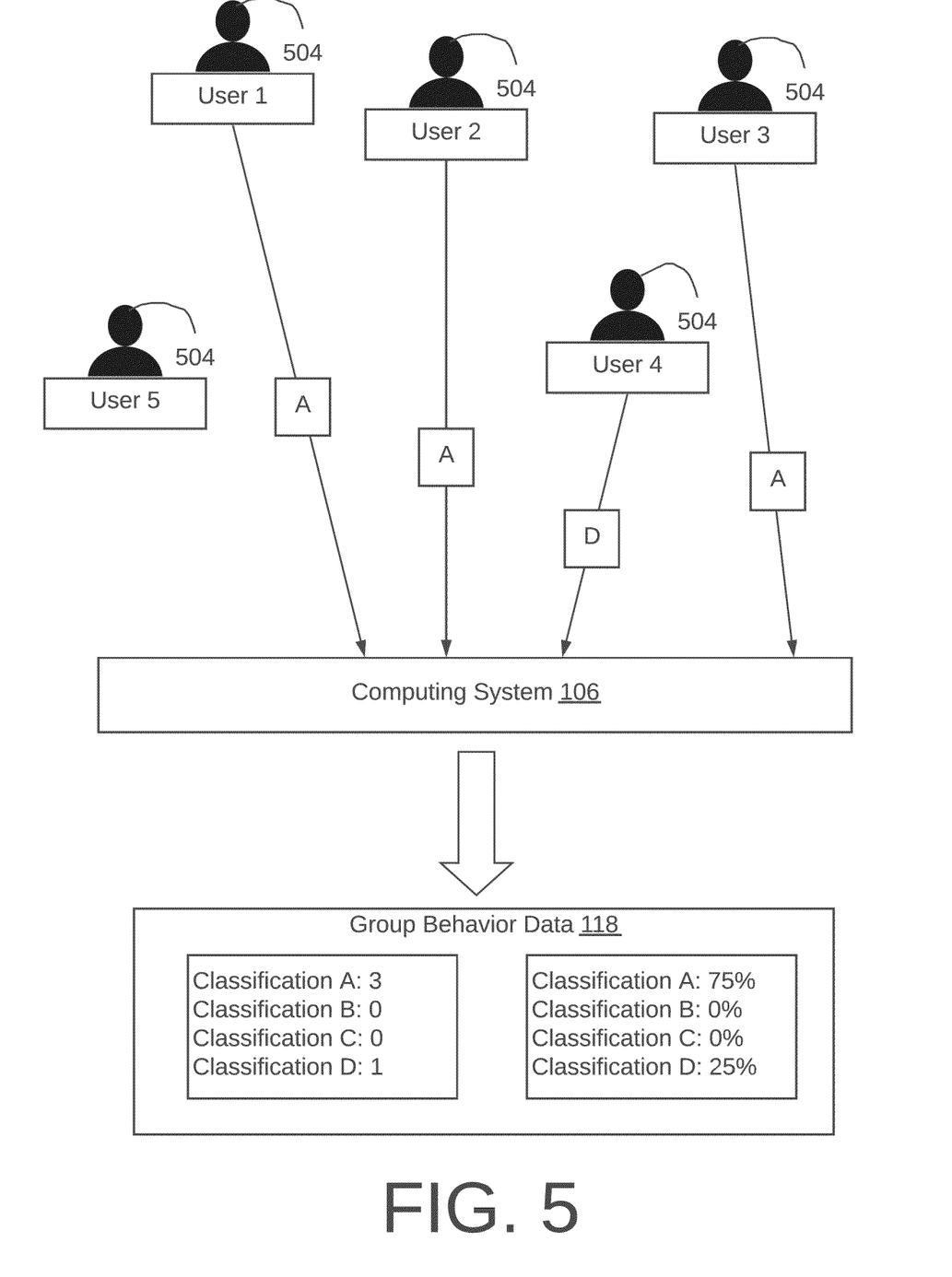
FIG. 5 depicts data used for analyzing group behavior in an embodiment of the immersive lighting system of FIG. 1, FIG. 6 schematically shows an example of communication between a lighting controller and a computing system in an embodiment of the immersive lighting system of FIG. 1.

FIG. 5 depicts data used for analyzing group behavior in an embodiment of the immersive lighting system of FIG. 1. FIG. 5 shows an embodiment where a computing system 106 is configured to analyze group behavior to create an immersive group lighting experience. In this embodiment, a computing system 106 communicates with a plurality of client devices 134 operated by respective users 504. Each client device 134 includes a sensor 137 that sends sensor data to the classifier 141 residing in the client device 134. The classifier 141 generates a classification 312.

After a client device 134 determines a classification 312, the classification is transmitted to the computing system 106. The example of FIG. 5 shows five users. Users 1, 2, and 3, each independently generate a classification 312 of their respective sensor data, which all corresponds to the same classification 312 labeled as Classification A. This means that Users 1, 2, 3, have exhibited a similar behavior captured by their respective sensors 137. User 4 generates a different classification 312 labeled as Classification D. This means that User 4's behavior is different from Users 1-3. User 5 does not generate a classification. This may be because there is no sensor data to analyze or the analyzed sensor data does not fall within a classification 312.

As shown in FIG. 5, classifications 312 are received asynchronously from different users over a varying period of time. The classifications 312 are received and stored as group behavior data 118. Group behavior may be collected for varying windows of time and analyzed. For a particular window of time, the computing system 106 records classifications received from a plurality of users 504 and stores the classifications as group behavior data 118. This group behavior data 118 is analyzed to provide metrics such as the frequency of a particular type of classification. In the example of FIG. 5, for a particular window of time, Classification A occurred three times, Classification B and C did not occur, and Classification D occurred once. The group behavior data 118 may also represent the received classifications in terms of percentages to show their relative frequency. Here Classification A occurred 75% of the time among all classifications 312 received for a particular window of time. The computing system 106 generates a control signal based on group behavior data 118. For example, the control signal may map to Classification A, which has the highest relative frequency. In other embodiments, a threshold value is applied to generate a control signal. For example, if a classification type exceeds a threshold frequency, then a control signal that maps to that classification type is generated. If a threshold frequency is 70%, then a control signal that maps to Classification A may be generated because Classification A has a frequency of 75%. As another example, if the occurrence of a particular classification type exceeds a threshold count, then a corresponding control signal is generated. If a threshold count is ten, then no control signals are generated if the count of the most frequency classification type falls below ten. The use of a threshold amount (e.g., threshold frequency or threshold count), may encourage more users to interact with the immersive lighting system or modify the way the interact with their client devices 134.

To elaborate on this example further, the computing system 106 determines whether a type of the received classification exceeds a threshold amount. For example, the threshold amount may be a predetermine number of a particular classification type received within a window of time. The threshold may also be defined in terms of a percentage. For example, the threshold amount is characterized as whether there is at least 50% of the received classifications 312 are of a particular type.

If the type of the received classification exceeds a threshold amount, the computing system 106 determines a corresponding control signal that maps to the type of classification. Then the computing system 106 sends the control signal to a lighting controller 103 to control the lighting infrastructure 100 according to the control signal.

FIG. 5 depicts an embodiment that may take place in a sports arena. Each client device 134 may classify motion according to a finite set of classifications 312. One classification 312 may correspond to a "stand-up" motion where a user stands up while another classification may corresponding to a "sit-down" motion where a user sits down. Upon detecting these classified motions, the client device 134 transmits the classification 312 to the computing system 106. The computing system 106 receives and stores the classifications 312 as group behavior data 118. If the number of classifications of a particular type exceeds a threshold amount, a corresponding control signal is generated. For example, if the group behavior is suggesting that many people are standing up, the corresponding control signal may be to play a predefined animation sequence, to increase the light intensity, or to alter the color output. This may encourage users to be more engaged as a group in order to affect the way the lighting infrastructure 100 outputs light.

Figure 6:
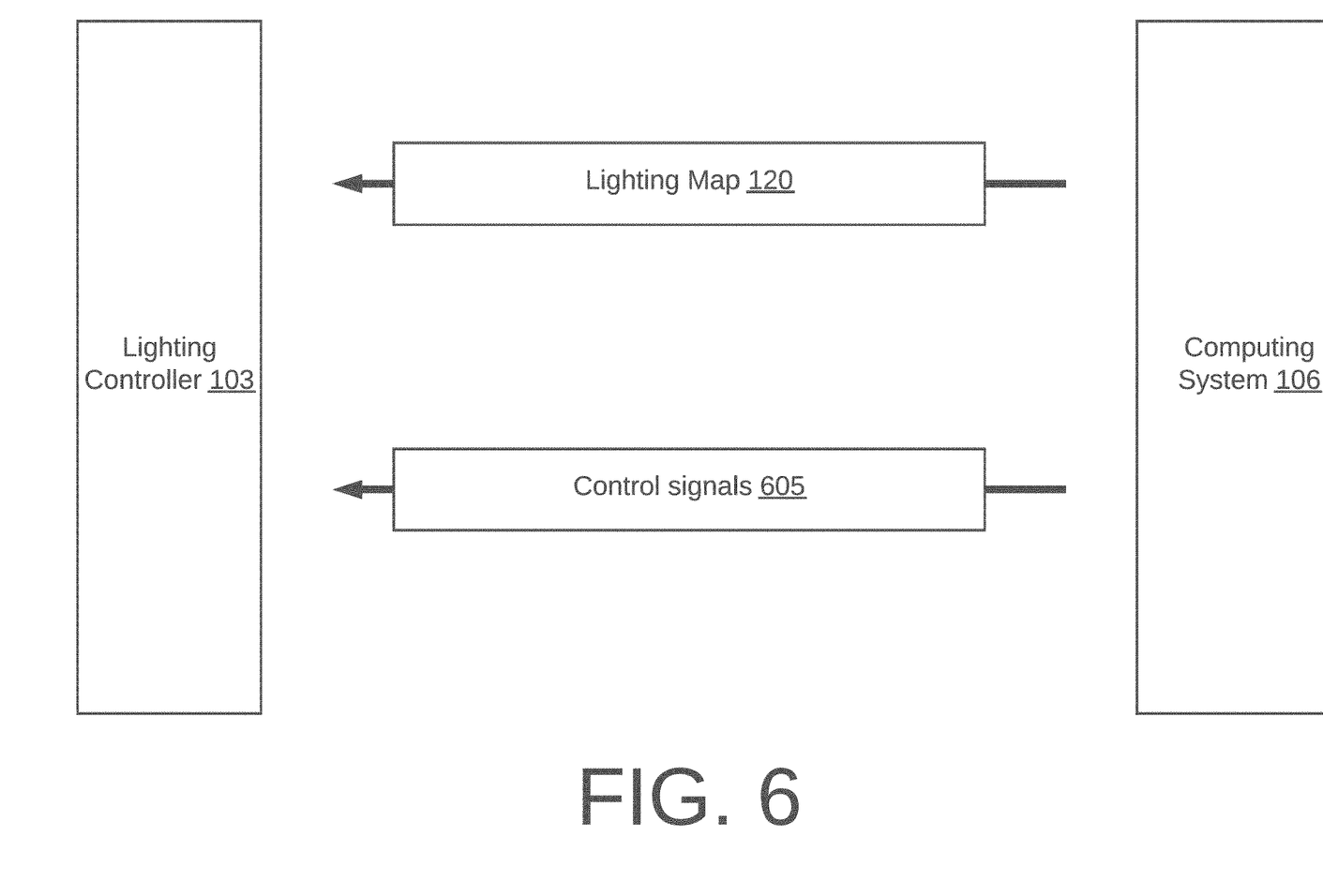

FIG. 6 schematically shows an example of communication between a lighting controller 103 and a computing system 106 in an embodiment of the immersive lighting system of FIG. 1. The computing system 106 may store a static or dynamically generated lighting map 120. The lighting map is transmitted to the lighting controller 103 to enable the lighting controller 103 to map received control signals 605 to particular lights or clusters of lights. For example, if the lighting infrastructure 100 is installed in a stadium, which is divided into twenty sections, the lighting map 120 may organize each light in the lighting infrastructure 100 into a designated section. This allows the lighting infrastructure 100 to have lights that are independently controlled. If there is an update to the lighting map 120, the updated lighting map 120 is transmitted to the lighting controller 103.

As previously described the computing device 106 receives a control instruction 212 from a particular client device 134 and then generates a corresponding control signal 605 to instruct the lighting infrastructure 100 according to the control instruction 212. In this respect, the control signal 605 is a transmission that embodies the control instruction 212 originating from a client device 134. The control signal 605 may also be generated by the computing system 106 based on group behavior data 118.

In addition to specifying how to control the lights, the control signal 605 includes the identities of the lights that should be controlled. Upon receiving a control signal 605, the lighting controller 103 applies the control signal 605 to the lights identified in the control signal using the lighting map 120.

Figure 7A:
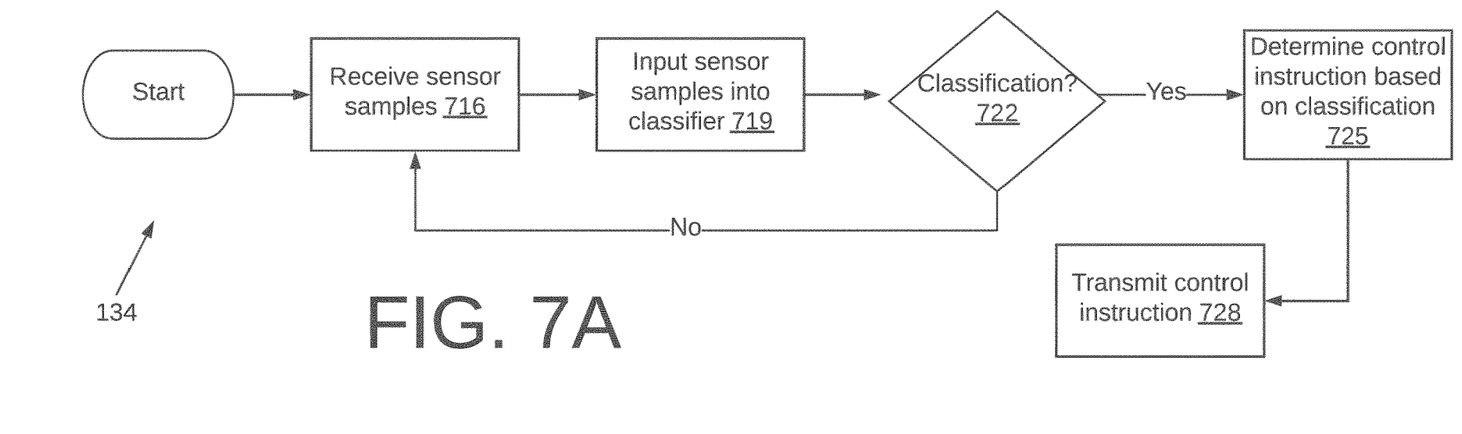
FIG. 7a is a flowchart illustrating an example of the functionality performed by a client device in an embodiment of the immersive lighting system of FIG. 1.

FIG. 7a is a flowchart illustrating an example of the functionality performed by a client device 134 in an embodiment of the immersive lighting system of FIG. 1. At 716, the client device 134 receives sensor samples 308. The sensor 137 may be integrated into the client device 134 or be an accessory to the client device 134. At 719, the client device 134 inputs the sensor samples 308 into a classifier 141. The sensor samples may be inputted as a continuous stream such that the classifier 141 continuously listens to sensor data. Alternatively, the sensor samples 308 are transmitted to the classifier 141 in response to a trigger. The trigger may be, for example, a button, a voice command, or some other user initiated instruction.

At 722, the client device 134 determines a classification 312. The classifier 141 implemented in the client device 134 analyzes the sensor samples 308 to determine the extent that the sensor samples 308 match predefined classifications 312. If a classification 312 can be made, then at 725, the client device 134 determines a control instruction based on the classification 312. For example, the client device 134 maps the classification 312 to a control instruction 212. In this respect, each type of classification corresponds to a control instruction 212.

At 728, the client device 134 transmits the control instruction 212 to a computing system 106. The computing system 106 receives the control instruction 212 and generates a corresponding control signal 605 to control the lighting infrastructure 100 according to the control instruction 212.

Figure 7B:
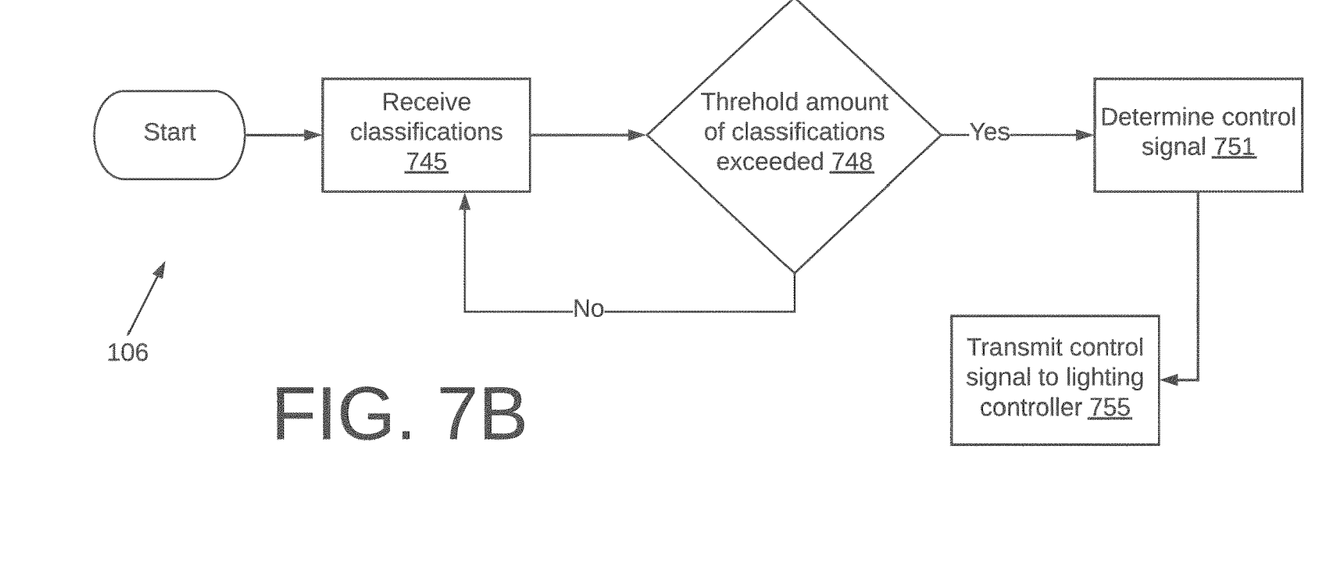
FIG. 7b is a flowchart illustrating an example of the functionality performed by a computing system in an embodiment of the immersive lighting system of FIG. 1, FIG. 8 schematically shows an embodiment of a computing system in the immersive lighting system of FIG. 1, and FIG. 9 schematically shows an embodiment of a client device in the immersive lighting system of FIG. 1.

FIG. 7b is a flowchart illustrating an example of the functionality performed by a computing system 106 in an embodiment of the immersive lighting system of FIG. 1. FIG. 7b shows an embodiment that implements an immersive group lighting experience. At 745, the computing system 106 receives classifications 312 from a plurality of client devices 134. Classifications 312 may be stored as group behavior data 118. Each classification represents, on an individual level, a particular sensor pattern.

When analyzing an aggregation of sensor patterns, the computing system may generate a corresponding control signal 605. At 748, the computing system determines whether a threshold amount of classifications are exceeded. For example, if the number of a particular type of classification 312 exceeds a threshold number or percentage (compared to other received types of classifications), then, at 751, the computing system 106 determines a corresponding control signal 605. The control signal includes an instruction indicating the way the lights in a lighting infrastructure 100 should be controlled. At 755, the computing system 106 transmits the control signal to the lighting infrastructure.

Figure 8:
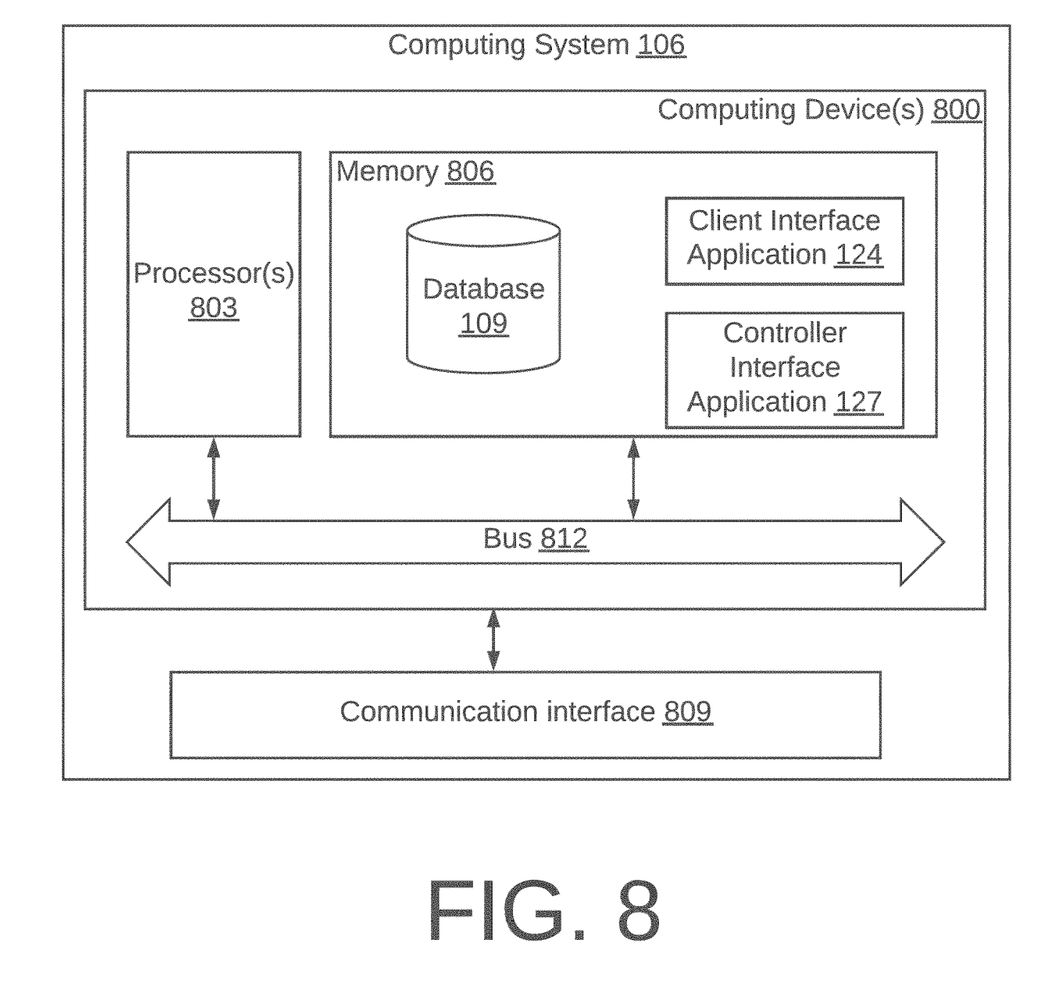

FIG. 8 schematically shows an embodiment of a computing system 106 in the immersive lighting system of FIG. 1. The computing system 106 includes one or more computing devices 800. Each computing device 800 includes at least one processor circuit, for example, having a processor 803, a memory 806, and a communication interface 809, each of which are coupled to a local interface 812 or bus. Each computing device 800 may comprise, for example, at least one server computer or like device. The communication interface 809 may include hardware, such as, for example, a network interface card, a modem, a transceiver, or radio and/or may include software such as, for example, a software module that encodes/decodes communication packets for transmission and receipt. The local interface 812 may comprise, for example, a data bus 812 with an accompanying address/control bus or other bus structure as can be appreciated.

Stored in the memory 806 are both data and several components that are executable by the processor 803. In particular, stored in the memory 806 and executable by the processor 803 is the client interface application 124 and the controller interface application 127. Also stored in the memory 806 may be a database 109 and other data. In addition, an operating system may be stored in the memory 806 and executable by the processor 803.

The communication interface 809 is configured to communicate with the lighting controller 103 and a plurality of client devices 134. The processor 803 uses the communication interface to establish communication with components external to the computing system 106. For example, the processor 803 may send instructions to the communication interface 809 to cause the transmission of data to the lighting controller 103 or client devices 134. Similarly, data received from the communication interface 809 is forwarded to the processor 803.

Figure 9:
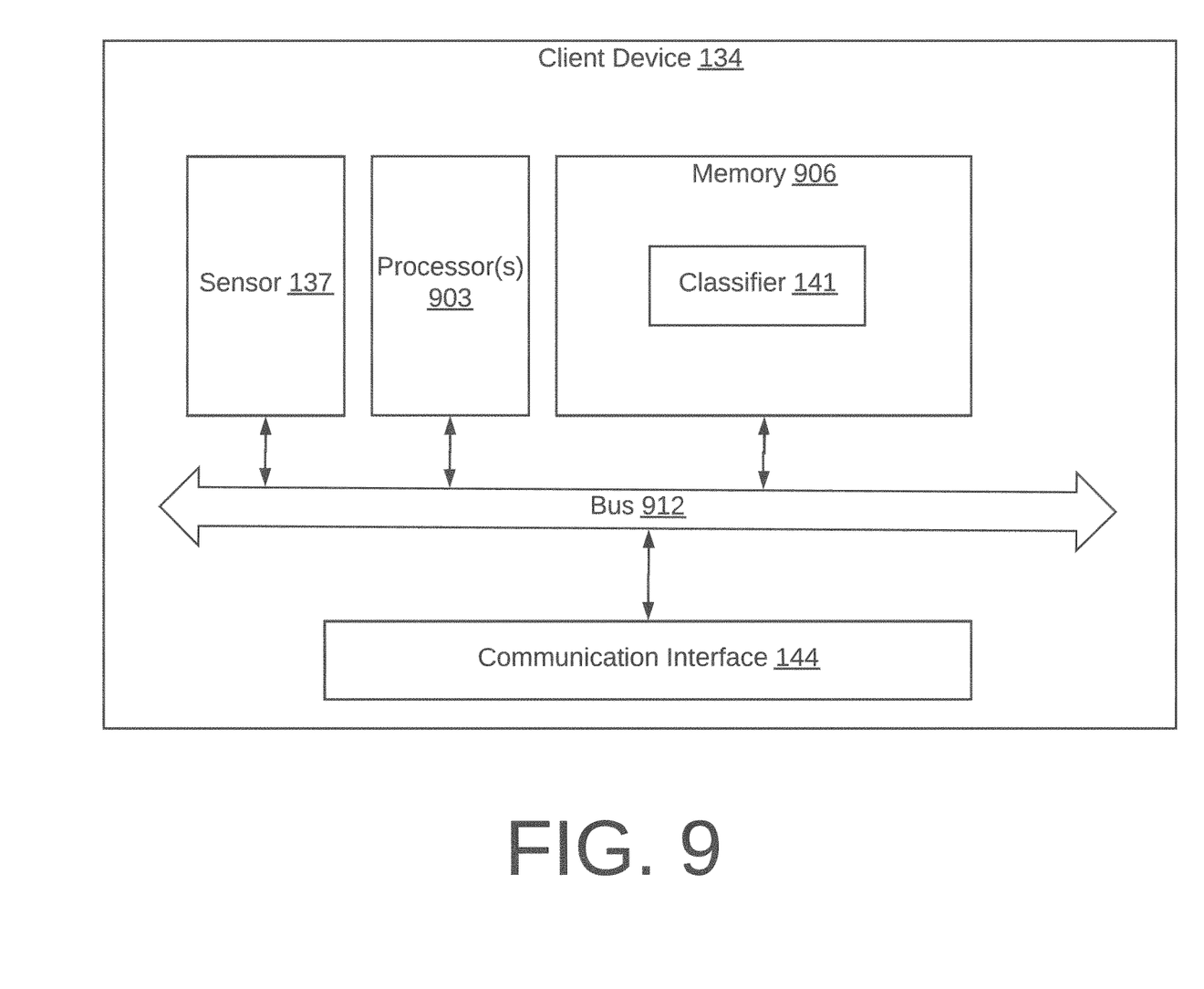

FIG. 9 schematically shows an embodiment of a client device 134 in the immersive lighting system of FIG. 1. The client device 134 includes a processor(s) 903, a memory 906, and a communication interface 144, each of which are coupled to a local interface 912 or bus. The client device 134 further includes a sensor 137 that may be a wired, wireless, or integrated component with respect to the client device 134.

The communication interface 144 may include hardware, such as, for example, a network interface card, a modem, a transceiver, or radio and/or may include software such as, for example, a software module that encodes/decodes communication packets for transmission and receipt. The local interface 912 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the classifier 141. In addition, an operating system or firmware may be stored in the memory 906 and executable by the processor 903.

The communication interface 144 is configured to communicate with the computing system 106. The processor 903 uses the communication interface to establish communication with components external to the computing system 106. For example, the processor 903 may send instructions to the communication interface 144 to cause the transmission of a control instruction 212 or classification 312. Similarly, data received from the communication interface 144 is forwarded to the processor 903.

With respect to both FIG. 8 and FIG. 9, it is understood that there may be other applications that are stored in the memory 806, 906 and are executable by the processor 803, 906 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, Flash®, or other programming languages.

Several software components are stored in the memory 806, 906 and are executable by the processor 803, 903. In this respect, the term "executable" means a program file that is in a form that can ultimately be run by the processor 803, 903. Examples of executable programs may be, for example, a compiled program that can be translated into machine code in a format that can be loaded into a random access portion of the memory 806, 906 and run by the processor 803, 903, source code that may be expressed in proper format such as object code that is capable of being loaded into a random access portion of the memory 806, 906 and executed by the processor 803, 903, or source code that may be interpreted by another executable program to generate instructions in a random access portion of the memory 806, 906 to be executed by the processor 803, 903, etc. An executable program may be stored in any portion or component of the memory 806, 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806, 906 is defined herein as including both volatile and nonvolatile memory and data storage components. Volatile components are those that do not retain data values upon loss of power. Nonvolatile components are those that retain data upon a loss of power. Thus, the memory 806, 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803, 903 may represent multiple processors 803, 903 and/or multiple processor cores and the memory 806, 906 may represent multiple memories 806, 906 that operate in parallel processing circuits, respectively. In such a case, the local interface 812, 912 may be an appropriate network that facilitates communication between any two of the multiple processors 803, 903, between any processor 803, 903 and any of the memories 806, 906, or between any two of the memories 806, 906, etc. The local interface 812, 912 may comprise additional systems designed to coordinate this communication, including, for example, performing load balancing. The processor 803, 903 may be of electrical or of some other available construction.

Although the software applications or programs as described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding the present invention and the annexed drawings. In particular, in regard to the various functions performed by the above described components (devices, systems, and the like), the terms (including a reference to a "means") used to describe such components are intended to correspond, unless otherwise indicated to any component such as hardware or combinations thereof, which performs the specified function of the described component (i.e., that is functionally equivalent), even though not structurally equivalent to the disclosed structure which performs the function in the illustrated implementations of the disclosure.

Although a particular feature of the present invention may have been illustrated and/or described with respect to only one of several implementations, any such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

In the claims references in parentheses refer to reference signs in drawings of exemplifying embodiments or to formulas of embodiments, thus increasing the intelligibility of the claim. These references shall not be construed as limiting the claim.

The invention claimed is:

1. A mobile client device adapted to be carried by a user and configured to communicate with a computing system, the computing system for sending a control signal to a lighting controller for controlling a lighting infrastructure, the client device comprising:
   a processor;
   a sensor;
   a communication interface configured to communicate with a computing system; and
   a memory that stores computer instructions, which, when executed, cause the processor to:
      receive sensor samples from the sensor; and
      classify a subset of the sensor samples to generate a classification of the sensor samples; and
      map the classification to a corresponding control instruction for controlling the lighting infrastructure and transmit the control instruction to the computing device for sending, in accordance with the control instruction, the control signal to the lighting controller, or
      transmit the classification to the computing system for receiving a plurality of classifications from a plurality of mobile client devices, selecting a classification type among the received plurality of classifications based on a relative frequency or a threshold amount of said classification type occurring in said received plurality of classifications, and sending, in accordance with the classification type, the control signal to the lighting controller.

2. The mobile client device of claim 1, wherein the sensor comprises a motion sensor, wherein the sensor samples comprise acceleration samples or gyroscope samples from the motion sensor, and wherein the classification comprises a motion classification specifying a type of motion.

3. The mobile client device of claim 1, wherein the sensor is a wireless accessory of the mobile client device.

4. The mobile client device of claim 1, wherein the client device comprises a wristwatch.

5. The mobile client device of claim 1, wherein the computer instructions comprise a long short-term memory (LSTM) classifier comprising a plurality of cells, each cell configured to receive a corresponding sensor sample from the subset of sensor samples.

6. The mobile client device of claim 1, where the classification corresponds to a classification type among a plurality of classification types.

7. The mobile client device of claim 5, wherein an output of the LSTM classifier is analyzed to generate probability scores for a respective classification types of a plurality of classification types, the probability score for a classification type indicating how likely it is that the subset of the sensor samples falls within said respective classification type.

8. A lighting infrastructure control system for controlling a lighting infrastructure comprising:
   a plurality of mobile client devices, each according to claim 1;
   a computing system adapted to
      communicate with each of the plurality of mobile client devices for receiving the control instruction or the classification from each mobile client device, and
      either send a control signal to a lighting controller in accordance with the received control instruction,
      or receive a plurality of classifications from the plurality of mobile client devices, select a classification type among the received plurality of classifications based on a relative frequency or a threshold amount of said classification type occurring in said received plurality of classifications, and send the control signal to a lighting controller in accordance with the classification type; and
   the lighting controller adapted to communicate with the computing system for receiving the control signal for controlling the lighting infrastructure and control the lighting infrastructure.

9. An immersive lighting system comprising the lighting infrastructure control system of claim 8 and a lighting infrastructure.

10. A computer-implemented method for controlling a lighting infrastructure, the method comprising the steps of:
   receiving, from a sensor of a mobile client device carried by a user, sensor samples; and
   classifying, by the mobile client device, a subset of the sensor samples to generate a classification of the sensor samples; and
   mapping, by the mobile client device, the classification to a corresponding control instruction for controlling the lighting infrastructure, transmitting, by the mobile client device, the control instruction to the computing device, determining, by the computing device, a control signal in accordance with the control instruction, and sending, by the computing device, the control signal to the lighting controller for controlling the lighting infrastructure;

or transmitting, by the mobile client device, the classification to the computing system, receiving, by the computing system, a plurality of classifications from a plurality of mobile client devices, selecting, by the computing system, a classification type among the received plurality of classifications based on a relative frequency or a threshold amount of said classification type occurring in said received plurality of classifications, determining, by the computing device, a control signal corresponding to the classification type, and sending, by the computing system, the control signal to the lighting controller for controlling the lighting infrastructure.

11. The computer-implemented method of claim 10, wherein the sensor comprises a motion sensor, and wherein the step of receiving comprises receiving acceleration samples or gyroscope samples from the motion sensor, and the step of classifying comprises specifying a type of motion.

12. The computer-implemented method of claim 10, wherein the sensor is a wireless accessory of the mobile client device.

13. The computer-implemented method of claim 10, wherein the steps performed by the mobile computing device are performed in a wristwatch.

14. The computer-implemented method of claim 10, wherein the step of classifying is performed by a long short-term memory (LSTM) classifier comprising a plurality of cells, each cell configured to receive a corresponding sensor sample from the subset of sensor samples and analyzing an output of the LSTM classifier to generate probability scores for a respective classification types of a plurality of classification types, the probability score for a classification type indicating how likely it is that the subset of the sensor samples falls within said respective classification type.

15. The computer-implemented method of claim 10, wherein the step of classifying comprises generating a classification corresponding to a classification type among a plurality of classification types.

* * * * *